April 13, 1937.   C. E. CARLSSON   2,077,309
BELT FASTENER FOR ROUND BELTS
Filed March 11, 1935
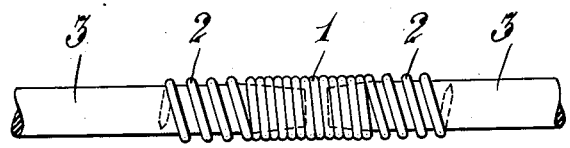
Inventor
Carl Eric Carlsson.
By Sommers + Young
Attys Patented Apr. 13, 1937

2,077,309

UNITED STATES PATENT OFFICE 2,077,309

BELT FASTENER FOR ROUND BELTS

Carl Eric Carlsson, Stockholm, Sweden
Application March 11, 1935, Serial No. 10,565
In Sweden May 12, 1934

1 Claim. (Cl. 24—123)

The present invention relates to belt fasteners for round belts. The belt fasteners as hitherto used in connection with round belts, comprise in their simplest form a wire clip the ends of which are inserted through holes formed near the belt ends to be connected, and are then bent towards the belt. Such belt fasteners cause a considerable weakening of the belt due to the necessity of cutting holes therein for the reception of the clip ends and, as a result, a fastener of this type will become less reliable and can only be used for the transmission of small powers. Belt fasteners constructed with a view to securing a higher reliability and to protect the belt, are as a rule of a more or less complicated and, consequently, expensive structure.

The invention has for its object to provide a belt fastener for round belts which is simple in construction, efficient and reliable in operation, and which does not cause any damaging of the belt, whereby the latter could be weakened at the joint. The belt fastener according to this invention comprises a spiral spring in which the belt ends are adapted to be inserted and to be rotated so as to screw themselves into the spring, the spring being formed with rather loose turns at its ends in order that this screwing operation may take place without difficulty. In order to avoid an undesired stretching of the belt, the middle portion of the spring has been given a certain remaining initial compression, so that said middle portion can only be stretched by a power which is higher than the normal belt tension. In other words, a stretching of the middle portion of the spring only takes place in case of an overloading of the belt.

In the accompanying drawing, one embodiment of a belt fastener according to this invention is illustrated.

The cylindrical spiral spring shown in the drawing, which may, preferably, be mannufactured from wire steel, comprises a middle portion 1 the turns of which are held close together under a certain remaining initial pressure. Due hereto, a certain power must be exerted in order to stretch this middle portion of the spring. The two end portions 2 of the spring, on the contrary, are formed with intervals between their turns in order that the belt ends 3 to be connected may be inserted in said portions by being screwed thereinto. The inner diameter of the spring should be somewhat less than the diameter of the belt in order to allow the turns of said end portions to positively engage the belt and to firmly hold the same, yet without in any way damaging it. As soon as the belt is subjected to a tension, the turns of said end portions will be stretched, thus reducing their diameter and more firmly gripping the belt ends. A belt fastener of this construction presents an outline which is much the same as that of the belt. The spring should be so dimensioned as to afford the same strength at least as the undivided belt. The compression of the middle portion 1 of the spring should be so chosen that, at normal load on the belt, it will remain in its compressed state, and will only stretch itself when subjected to a tension representing an overload on the belt. It is thus seen that the belt fastener maintains a constant total length of the belt under normal conditions of operation, but affords at the same time a certain protection against overload, inasmuch as the stretching of the spring then occuring will facilitate a slipping action of the belt.

What I claim is:—

A belt fastener for round belts, comprising a cylindrical spiral spring of steel wire, including a closely wound middle portion having a resistance to stretching greater than the normal load on the belt in operation, and two end portions formed with intervals between their turns whereby the belt ends may be brought into engagement therewith by a screwing action and to allow said end portions to streach under the normal operating load, whereby the end portions are reduced in diameter and more firmly grip the belt as a result of the applying of a load on the belt, whereas the middle portion maintains its length, thereby substantially preventing increasing of the total length of the belt when under normal load.

CARL ERIC CARLSSON.